(12) United States Patent
Lechner et al.

(10) Patent No.: US 10,099,527 B2
(45) Date of Patent: Oct. 16, 2018

(54) SUSPENSION-SPRING UNIT FOR A VEHICLE CHASSIS

(71) Applicant: ThyssenKrupp Federn und Stabilisatoren GmbH, Hagen (DE)

(72) Inventors: Dieter Lechner, Düsseldorf (DE); Marcel Gross, Dortmund (DE); Gerhard Scharr, Elmenhorst (DE)

(73) Assignee: THYSSENKRUPP FEDERN UND STABILISATOREN GMBH, Hagen (DE)

( * ) Notice: Subject to any disclaimer, the term of this patent is extended or adjusted under 35 U.S.C. 154(b) by 0 days.

(21) Appl. No.: 15/120,980

(22) PCT Filed: Feb. 19, 2015

(86) PCT No.: PCT/EP2015/053534
§ 371 (c)(1),
(2) Date: Aug. 23, 2016

(87) PCT Pub. No.: WO2015/124692
PCT Pub. Date: Aug. 27, 2015

(65) Prior Publication Data
US 2016/0368341 A1    Dec. 22, 2016

(30) Foreign Application Priority Data
Feb. 24, 2014 (DE) .......................... 10 2014 102 335

(51) Int. Cl.
*B60G 11/02* (2006.01)
*F16F 1/368* (2006.01)
*F16F 3/087* (2006.01)

(52) U.S. Cl.
CPC ............ *B60G 11/02* (2013.01); *F16F 1/3683* (2013.01); *F16F 1/3686* (2013.01);
(Continued)

(58) Field of Classification Search
CPC ........ F16F 1/368; F16F 1/3683; F16F 1/3686; F16F 3/087; F16F 3/0876;
(Continued)

(56) References Cited

U.S. PATENT DOCUMENTS

| 961 A | * | 10/1838 | Robinson | ............... B60G 11/04 267/43 |
| 44,908 A | * | 11/1864 | Wright | ................... B60G 11/04 267/43 |

(Continued)

FOREIGN PATENT DOCUMENTS

| CN | 101691884 A | 4/2010 |
| DE | 693338 C | 7/1940 |

(Continued)

OTHER PUBLICATIONS

English abstract for CN101691884A.
(Continued)

*Primary Examiner* — Thomas J Williams
(74) *Attorney, Agent, or Firm* — Lathrop Gage L.L.P.

(57) ABSTRACT

A suspension spring unit for a vehicle chassis can be positioned between a vehicle body and a wheel carrier. In some examples, the suspension spring unit may comprise at least four fiber composite leaf springs. The leaf springs may have a flat extent between two spring ends and may be connected to each other in pairs at a distance from each other. End connecting elements disposed over the spring ends may receive the spring ends so as to form at least two leaf spring pairs arranged in series. The leaf spring pairs may be connected to each other by central connecting elements via central regions between the spring ends of the leaf springs.

16 Claims, 2 Drawing Sheets

(52) U.S. Cl.
CPC ........ *F16F 3/0876* (2013.01); *B60G 2202/11* (2013.01); *B60G 2206/428* (2013.01); *B60G 2206/7101* (2013.01); *F16F 2224/0241* (2013.01)

(58) Field of Classification Search
CPC .. F16F 2224/0241; B60G 11/02; B60G 11/06; B60G 2202/11; B60G 2206/428; B60G 2206/7101
USPC ............... 267/36.1, 42, 44, 43, 260, 261
See application file for complete search history.

(56) References Cited

U.S. PATENT DOCUMENTS

| | | | | |
|---|---|---|---|---|
| 89,621 | A | * | 5/1869 | Black ............ B60G 11/04 267/43 |
| 344,785 | A | * | 6/1886 | Ludlum et al. ...... B60G 11/04 267/43 |
| 921,947 | A | * | 5/1909 | Burnet ............ B60G 11/04 267/43 |
| 922,454 | A | * | 5/1909 | Burnet ............ B60G 11/04 267/43 |
| 1,280,432 | A | * | 10/1918 | Fagan ............ B60G 11/04 267/43 |
| 3,879,025 | A | * | 4/1975 | Dillard ............ F16F 1/02 267/165 |
| 5,643,148 | A | * | 7/1997 | Naville ............ A43B 13/183 482/124 |

FOREIGN PATENT DOCUMENTS

| | | | |
|---|---|---|---|
| DE | 3701265 A1 | 7/1988 | |
| DE | 10141432 A1 | 3/2003 | |
| GB | 2367876 A | 4/2002 | |
| JP | 0003157352 | 1/2010 | |
| JP | 11982021847 | 2/2017 | |
| RU | 2231700 C1 | 6/2004 | |
| WO | WO 8905241 A1 * | 6/1989 | ............ F16F 1/22 |

OTHER PUBLICATIONS

International Search Report for PCT/EP2015/053534 dated Dec. 9, 2015 (dated Dec. 18, 2015).
Russian Application No. 2016138013, Office Action dated Jan. 25, 2018, 13 pages.
Japanese Application No. 2016-553579, Office Action dated Mar. 27, 2018, 5 pages.

* cited by examiner

SUSPENSION-SPRING UNIT FOR A VEHICLE CHASSIS

CROSS REFERENCE TO RELATED APPLICATIONS

This application is a U.S. National Stage Entry of International Patent Application Serial Number PCT/EP2015/053534, filed Feb. 19, 2015, which claims priority to German Patent Application No. 10 2014 102 335.8 filed Feb. 24, 2014, the entire contents of both of which are incorporated herein by reference.

FIELD

The present disclosure relates to suspension spring units primarily for motor vehicles and, more particularly, to suspension spring units having fiber composite leaf springs.

BACKGROUND

DE 101 41 432 A1 discloses a suspension spring unit comprising two leaf springs which are formed from a weight-minimizing fiber composite material. The suspension spring unit is constructed from two leaf spring elements which comprise an arch, wherein the inner sides of the arch of the leaf springs face each other. End connecting elements via which the two leaf springs are connected to each other are located at the spring ends of the leaf springs. It is specified here that at least two leaf springs composed of fiber composite material can form the suspension spring unit, wherein, in the case of a construction of more than two leaf springs, the latter, instead of a single-layered design, can be arranged stacked on one another in multiple layers and can be connected to one another via the end connecting elements. A resulting stacked construction of leaf spring elements produced at least from a steel material is known, for example, from the manufacturing of utility vehicles.

In order to arrange the suspension spring unit between a vehicle body and a wheel carrier, central connecting elements in the form of screw pins are located in the central regions of the leaf springs, and therefore the upper leaf spring and the lower leaf spring can be screwed to the vehicle body and to the wheel carrier, respectively.

During operation of such a leaf spring unit, a minimum spring deflection is required, and stoppers are proposed which are attached on the inside in the region of the central regions to the leaf springs such that the opposite stoppers can strike against each other as stops when the suspension spring unit is subjected to a compressive force, as a result of which the maximum spring deflection is greatly restricted.

Disadvantageously, transverse forces can be absorbed by the shown construction of the suspension spring unit only to a reduced extent since an oblique load on the leaf spring pair may rapidly lead to failure of the suspension spring unit. In particular, in the case of the shown construction, the possibility does not arise of the leaf spring pair being able to bend laterally outward, and, because of the required relatively large spring deflection in use in a vehicle chassis, a great length is required in the transverse direction of the leaf springs that runs perpendicularly to the spring direction. The spring direction is defined here by the positions of the central connecting elements which are shown. A multi-layered configuration of the leaf springs in a packet arrangement, which leaf springs, mounted in a stacked manner, in the case of the shown bilateral arch direction of the leaf springs, are connected to each other with the inner side of their arch via the end connecting elements, kinetic energy not required in the suspension spring unit in conjunction with a shock absorber as the suspension spring unit for a vehicle chassis can be dissipated.

DETAILED DESCRIPTION

Figure 1:
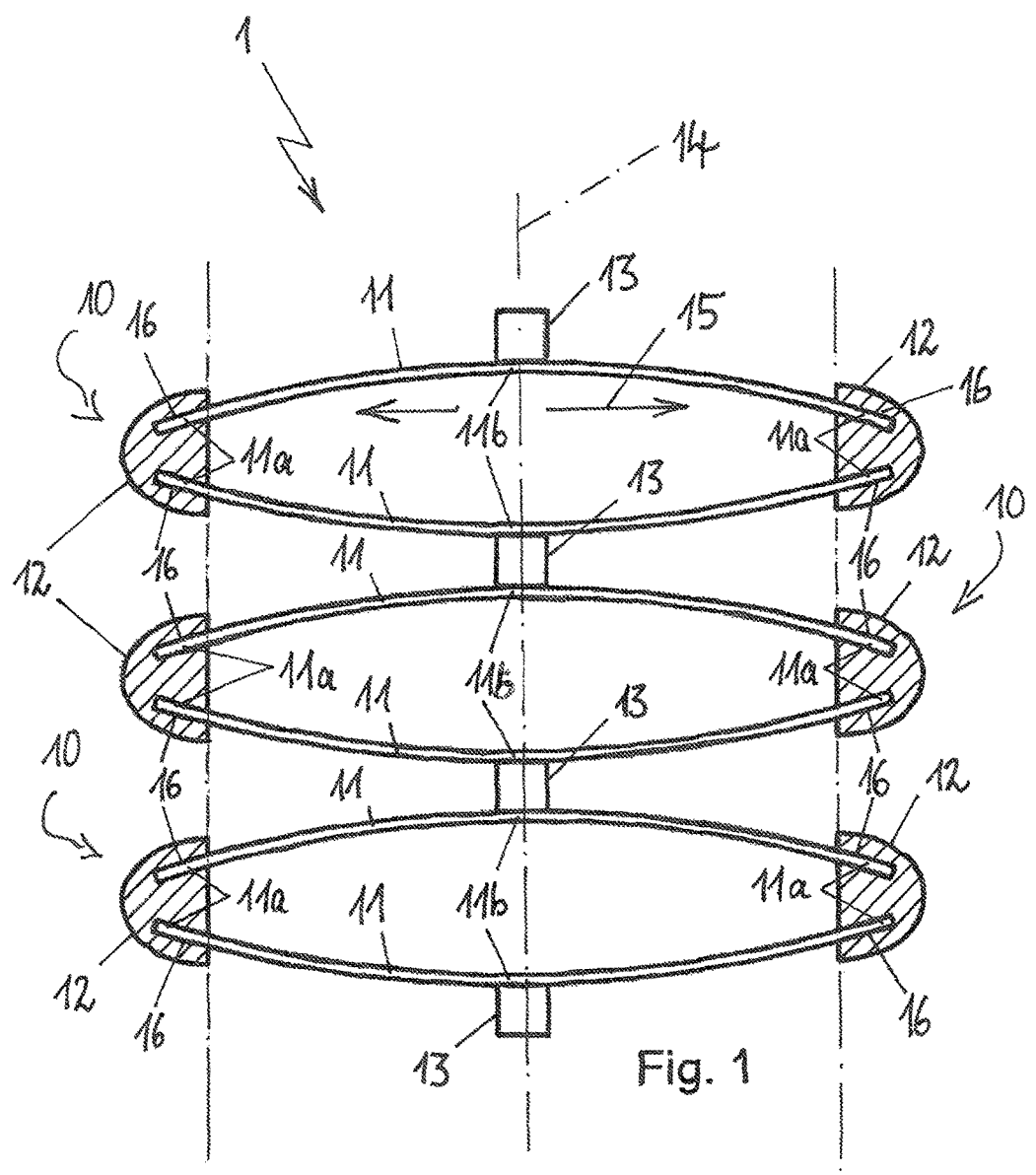
FIG. 1 is a schematized view of an example suspension spring unit with example leaf springs comprising fiber composite material.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

The object of the invention is the development of a suspension spring unit for a vehicle chassis for arrangement between a vehicle body and a wheel carrier. The suspension spring unit is intended here to be able to absorb transverse forces to an improved extent with a weight-minimal design and to permit a greater spring deflection.

The object is achieved on the basis of a suspension spring unit according to the known features from claim 1 in conjunction with the characterizing features. Advantageous developments of the invention are specified in the dependent claims.

According to the invention, a suspension spring unit for a vehicle chassis for arrangement between a vehicle body and a wheel carrier is proposed, which comprises at least four leaf springs composed of a fiber composite material, wherein the leaf springs have a flat extent between two spring ends and are connected to each other in pairs at a distance from each other by means of end connecting elements over the spring ends, and therefore at least two leaf spring pairs arranged in series are formed, and wherein the leaf spring pairs are connected to each other via central regions, which are formed between the spring ends, of the leaf springs by means of central connecting elements.

By means of the construction according to the invention of the suspension spring unit from a plurality of leaf spring pairs arranged in series, the advantage of a significantly increased spring deflection is achieved since the overall spring deflection of the suspension spring unit is formed by the sum of the individual spring deflections of the leaf springs or of the leaf spring pairs. The leaf springs are arranged individually here and are connected to one another either via the end connecting elements or the central connecting elements. In particular, the leaf springs are therefore not arranged in a stack or packet arrangement with respect to one another, and the leaf springs do not rest flat on one another. This additionally achieves the advantage that impurities which may damage the surface of the leaf springs cannot be deposited between the leaf springs.

The suspension spring unit can comprise at least two central connecting elements for connecting the leaf spring pairs, wherein the central connecting elements are also attached to the end-side leaf springs in the central region in order to make it possible to connect the suspension spring unit, for example, to a vehicle body or to a wheel carrier which can have a different configuration than central connecting elements which are arranged between the leaf springs. At least two of the central connecting elements for connecting the leaf spring pairs determine a spring direction which extends through the central connecting elements. The spring direction forms in this case that direction in which the suspension spring unit compresses, but, because of the construction of the suspension spring unit, the spring direction does not have to form a straight line through the suspension spring unit, and the suspension spring unit may also be configured, for example, in an arc shape and may compress to the latter.

The leaf springs of the suspension spring unit can be of plane design or can preferably comprise an arch, wherein the leaf springs which are connected to each other in pairs via the end connecting elements face each other with the inner side of their arch. Consequently, the leaf springs face each other with the outer side of their arch, said leaf springs being connected to each other by means of the central connecting elements. The arch of the leaf springs therefore alternates in the spring direction over the longitudinal extent of the suspension spring unit, and therefore the leaf springs in pairs face each other with the inner sides of their arch or face away from each other with the outer sides of their arch. If the leaf springs are of plane design, the plane configuration of the leaf springs is produced only in the force-free state of the suspension spring unit, and, in the event of a compressive or tensile loading of the suspension spring unit, the leaf springs are likewise arched, and therefore the outer sides of the arch of two leaf springs forming a leaf spring pair face each other.

The above-described function of the suspension spring unit with arched leaf springs is produced in particular in the force-free state of the suspension spring unit, and, in the event of a compressive loading of the spring unit, the leaf springs which are arched without any force can be pulled flat, and therefore the above description of the arches of the leaf springs applies only in the force-free state of the suspension spring unit.

The leaf spring pairs can be formed with an elongate extent in a transverse direction running transversely with respect to the spring direction. The transverse directions of two or more leaf spring pairs can have in this case an orientation identical to one another or rotated about the spring direction with respect to one another. If the leaf spring pairs are arranged rotated with respect to one another in their transverse directions, transverse forces can be absorbed to an improved extent by the suspension spring unit, and the leaf spring pairs can define, together with the central connecting elements, a spring direction which has a curvature.

With further advantage, the fiber composite material of the leaf springs can comprise reinforcing fibers, wherein the reinforcing fibers can run in a direction of the leaf springs that is formed as a longitudinal direction in a manner extending between the spring ends. As a result, the load-absorption capability by the leaf springs is optimized, and the load absorption by the leaf springs is improved in relation to a macroscopically homogeneous, statistical distribution of the fibers in the fiber composite material. The reinforcing fibers can be embedded together with further fibers, which in particular also run transversely or diagonally with respect to the direction in which the reinforcing fibers run, in a matrix, for example formed by an epoxy resin.

The end connecting elements can be formed from a rubber, from plastic or a metallic material and can have two in particular obliquely formed receiving slots in which the spring ends of the leaf springs can be accommodated. The smaller individual spring deflections of the leaf spring pairs, which are held together by the end connecting elements, results in a smaller movement of the spring ends in the receiving slots, as a result of which the connection between the leaf springs and the end connecting elements is subjected to a smaller loading. Furthermore, the end connecting elements can be formed by a harder material, as a result of which the load-bearing capability of the suspension spring unit is increased.

The at least one central connecting element can be connected to the leaf springs in such a manner that the leaf springs run with an unchanged cross-sectional profile through the connecting point to the central connecting element. This gives rise to improved loadability and simpler capability of producing the leaf springs, the structure of which is not weakened by the central connecting elements. With particular advantage, the cross section with which the leaf springs extend between the spring ends can be unchanged, i.e. can be designed to remain the same, in the transverse direction over the entire length of the leaf springs.

The leaf springs can be formed in an arcuate, parabolic or rectilinearly running manner between the spring ends in the force-free state. For example, the leaf springs can also be of curved design in the transverse direction between the leaf spring elements, but in particular the leaf springs are shaped symmetrically on both sides of the arrangement of the central connecting elements.

According to a further advantageous embodiment of the suspension spring unit according to the invention, at least one guide element can be provided by means of which the leaf spring pairs are guided, in particular in order to prevent rotation of the leaf spring pairs about the spring direction. The individual leaf springs or leaf spring pairs can slide off in the event of compression in the guide element, in order to ensure the movability of the leaf springs in relation to the guide element which for example is arranged rigidly. For example, two guide elements can also oppositely surround the leaf springs, and, for example, the leaf springs can be guided in the guide element via the end connecting elements. It is also conceivable for the guide element or the guide elements to form a housing which protects the leaf springs from moisture and impurities.

FIG. 1 shows a suspension spring unit 1 in a schematized view with leaf springs 11 which are formed from a fiber composite material and form spring bodies of the suspension spring unit 1. The suspension spring unit 1 can serve in a manner not shown specifically for a vehicle chassis of a vehicle and can be arranged, for example, between a vehicle body and a wheel carrier and can thus form part of a vehicle chassis.

The leaf springs 11 have a flat curved extent between two spring ends, and the leaf springs 11 are connected to each other in pairs at a distance from each other by means of end connecting elements 12 over the spring ends 11a, as a result of which three leaf spring pairs 10 arranged in series are formed.

The leaf springs 11 are formed with an arch in the force-free state, and the inner sides of the arch of the leaf springs 11 face each other so as to form each leaf spring pair 10. By way of example, three leaf spring pairs 10 with a total of six leaf springs 11 are shown. In a departure from the illustration of an example of the suspension spring unit 1 with three leaf spring pairs 10, two or more than three leaf spring pairs 10 each having two leaf springs 11 can also form the suspension spring unit 1.

The leaf springs 11 have central regions 11b centrally between the spring ends 11a, and the leaf springs 11 of adjacent leaf spring pairs 10 are connected to each other via the central regions 11b by central connecting elements 13. Further central connecting elements 13 are illustrated on the outer-side leaf springs 11 for the peripheral connection and for introduction of a force into the suspension spring unit 1.

The central connecting elements 13 define a spring direction 14 which runs through the central connecting elements 13. The suspension spring unit 1 is shown in the unloaded state, and therefore the spring direction 14 forms a straight line. A transverse direction 15 is defined transversely with respect to the spring direction 14, and the leaf springs 11 extend with their cross-sectional shape in an elongate manner in the transverse direction 15. The end connecting elements 12 can be formed from a rubber material and have receiving slots 16 which are formed in the manner of pockets and in which the spring ends 11a of the leaf springs 11 fit. The spring ends 11a can be adhesively bonded here in the receiving slots 16.

Figure 2:
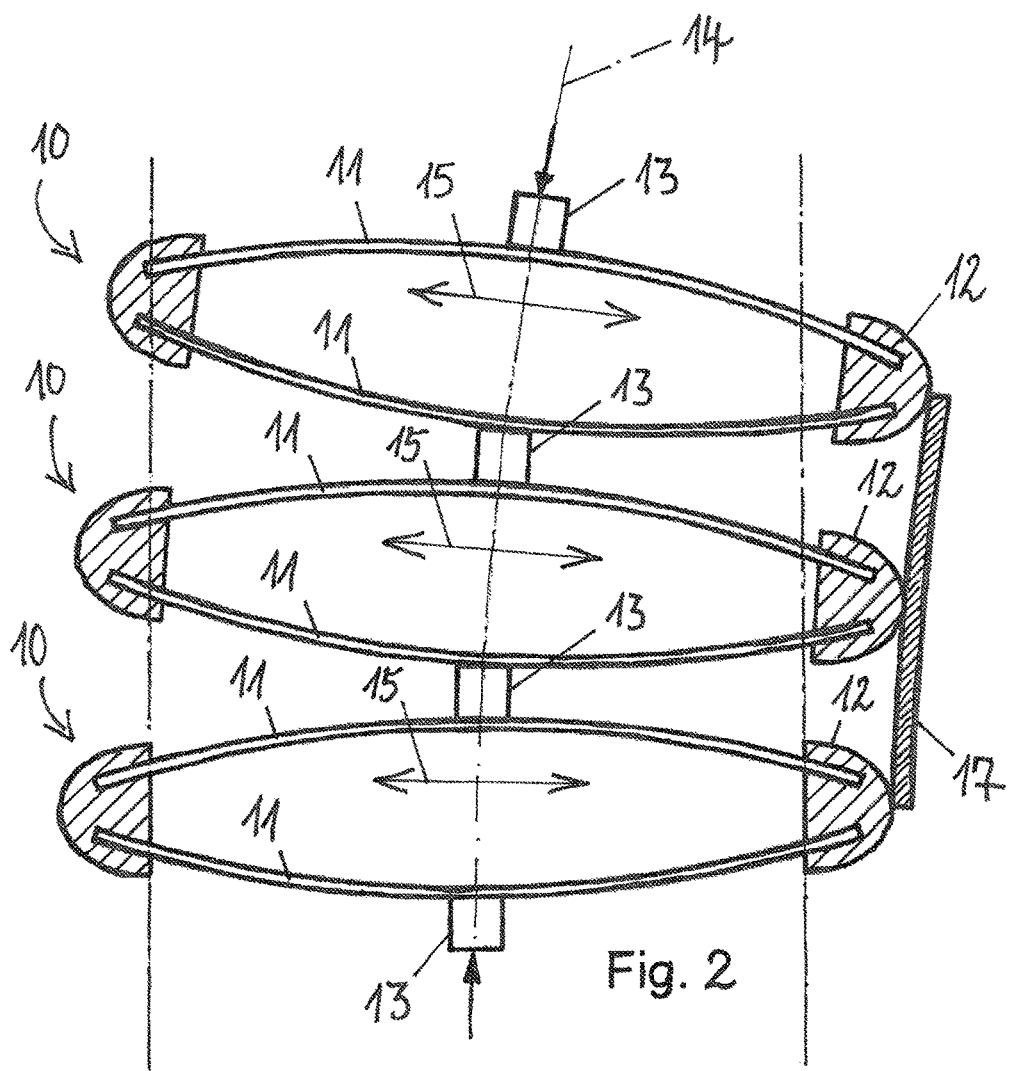
FIG. 2 is a schematized view of the example suspension spring unit of FIG. 1 in a force-loaded state wherein a spring direction is curved.

FIG. 2 shows the suspension spring unit 1 in a loaded state, indicated by two arrows which denote a force applied to the central connecting elements 13 mounted on the outer side of the leaf springs 11. By means of the force loading, the spring direction 14 undergoes a curvature via the central connecting elements 13, wherein only by way of example the three leaf spring pairs 10 have an orientation identical to one another in their transverse direction 15 about the spring direction 14. In order to stabilize the orientation of the leaf spring pairs 10 about the spring direction 14, a guide element 17 which guides the three leaf spring pairs 10 via the end connecting elements 12 is shown in schematized form. The guide element 17 can be configured, for example, in such a manner that the orientation of the transverse direction 15 about the spring direction 14 is maintained, but the guide element 17 can be elastically guided in the spring direction 14 in order to avoid an external force loading on the leaf spring pairs 10 in the spring direction 14, or the end connecting elements 12 can be guided in the spring direction 14 on the guide element 17 and can slide on the latter.

The series arrangement of the leaf spring pairs 10 results in an overall spring deflection of the suspension spring unit 1 that is produced from the sum of the individual spring deflections of the leaf spring pairs 10. The leaf springs 11 are of rectangular configuration and have an elongate extent in the transverse direction 15.

The invention is not restricted in its design to the preferred exemplary embodiment indicated above. On the contrary, a number of variants are conceivable which make use of the presented solution even in embodiments of fundamentally different type. All of the features and/or advantages revealed in the claims, the description or the drawings, including structural details or spatial arrangements, may be essential to the invention both by themselves and in very different combinations.

What is claimed is:

1. A suspension spring unit for a vehicle chassis, the suspension spring unit being positionable between a vehicle body and a wheel carrier, the suspension spring unit comprising:
   at least four leaf springs that are spaced apart from one another and comprise fiber composite material, wherein each of the at least four leaf springs includes a central region centrally located between two spring ends, each central region having an unchanging cross-sectional profile;
   end connecting elements disposed at the spring ends of the at least four leaf springs, wherein each of the end connecting elements connects a pair of the at least four leaf springs such that at least two leaf spring pairs are arranged in series; and
   at least one central connecting element that connects the at least two leaf spring pairs at respective said central regions, the at least two leaf spring pairs and the at least one central connecting element together defining a spring direction which has a curvature.

2. The suspension spring unit of claim 1 comprising at least two central connecting elements, wherein the spring direction having a curvature runs through the at least two central connecting elements.

3. The suspension spring unit of claim 1 wherein each of the at least four leaf springs comprises an arch, wherein with respect to each of the at least two leaf spring pairs, inner faces of the arches of the leaf springs face one another.

4. The suspension spring unit of claim 3 comprising at least two central connecting elements, wherein the spring direction having a curvature runs through the at least two central connecting elements, wherein each of the at least two leaf spring pairs includes an elongate extent in a direction that is transverse to the spring direction.

5. The suspension spring unit of claim 4 wherein the transverse directions of the at least two leaf spring pairs have an orientation that is either identical or rotated about the spring direction with respect to one another.

6. The suspension spring unit of claim 1 wherein the fiber composite material comprises reinforcing fibers that run in a manner extending between the spring ends.

7. The suspension spring unit of claim 1 wherein the end connecting elements comprise rubber, plastic, or a metallic material, wherein each of the end connecting elements comprises slots that receive the spring ends.

8. The suspension spring unit of claim 1 wherein in a force-free state the at least four leaf springs comprise an arcuate configuration, a parabolic configuration, or a rectilinear configuration between the spring ends.

9. The suspension spring unit of claim 1 further comprising:
   at least two central connecting elements, wherein the spring direction having a curvature runs through the at least two central connecting elements; and
   a guide element for preventing the at least two leaf spring pairs from rotating about the spring direction.

10. A suspension spring unit for a vehicle chassis for arrangement between a vehicle body and a wheel carrier, comprising four leaf springs composed of a fiber composite material, wherein the leaf springs each have a central region centrally located between two spring ends and are connected to each other in pairs at a distance from each other by end connecting elements over the spring ends, and therefore two leaf spring pairs arranged in series are formed, and wherein the two leaf spring pairs are connected to each other at respective said central regions by a central connecting element, the two leaf spring pairs and the central connecting element together defining a spring direction which has a curvature.

11. The suspension spring unit of claim 10 further comprising two additional leaf springs forming a third leaf spring pair connected to the two leaf spring pairs by another central connecting element.

12. A suspension spring unit for a vehicle chassis, the suspension spring unit being positionable between a vehicle body and a wheel carrier, the suspension spring unit comprising:

four leaf springs that are spaced apart from one another and comprise fiber composite material, each of the four leaf springs having a central region and a center point centrally located between two spring ends, each central region having an unchanging and unweakened cross-sectional profile;

four end connecting elements disposed at the spring ends of the four leaf springs; each of the end connecting elements having an upper portion, a lower portion, a solid central portion between the upper and lower portions, a first pocket directly between the upper portion and the central portion, and a second pocket directly between the central portion and the lower portion; each of the end connecting elements connecting a pair of the respective leaf springs in the first pocket and the second pocket such that two leaf spring pairs are arranged in series; and a central connecting element connecting the two leaf spring pairs at respective said central regions;

wherein, when the suspension spring unit is at an unloaded state, each of the center points lies along a first straight line.

13. The suspension spring unit of claim 12 wherein, when the suspension spring unit is at the unloaded state:

for two of the end connecting elements, the upper portion, the central portion, and the lower portion terminate along a second straight line at the first and second pockets; the second straight line being parallel to the first straight line; and for another two of the end connecting elements, the upper portion, the central portion, and the lower portion terminate along a third straight line at the first and second pockets; the third straight line being parallel to the first and second straight lines.

14. The suspension spring unit of claim 13 wherein for each end connecting element the upper portion, the central portion, and the lower portion collectively define a planar proximal face; the planar proximal face of two of the end connecting elements being colinear with the second straight line; the planar proximal face of another two of the end connecting elements being colinear with the third straight line.

15. The suspension spring unit of claim 12 wherein, when the suspension spring unit is at a loaded state, each of the center points lies along a first curved line.

16. The suspension spring unit of claim 12 wherein the entire central connecting element is flexible.

* * * * *